(12) United States Patent
Gracieux

(10) Patent No.: US 9,082,089 B2
(45) Date of Patent: Jul. 14, 2015

(54) SYSTEM AND METHOD FOR MANAGING BANDWIDTH UTILIZATION

(75) Inventor: Marc E. Gracieux, Cary, NC (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 2183 days.

(21) Appl. No.: 11/956,880

(22) Filed: Dec. 14, 2007

(65) Prior Publication Data

US 2009/0157443 A1 Jun. 18, 2009

(51) Int. Cl.
*G06Q 20/00* (2012.01)
*G06Q 10/06* (2012.01)
*G06Q 50/06* (2012.01)

(52) U.S. Cl.
CPC .............. *G06Q 10/06* (2013.01); *G06Q 50/06* (2013.01)

(58) Field of Classification Search
USPC .......................................................... 705/63
See application file for complete search history.

(56) References Cited

U.S. PATENT DOCUMENTS

| | | | | |
|---|---|---|---|---|
| 5,970,403 | A * | 10/1999 | Alperovich et al. .......... | 455/406 |
| 2006/0104370 | A1 * | 5/2006 | Yamanaka et al. ............ | 375/242 |
| 2007/0180119 | A1 * | 8/2007 | Khivesara et al. ............ | 709/226 |

OTHER PUBLICATIONS

B. Claise, "Cisco Systems NetFlow Services Export Version 9", Internet Engineering Task Force, Request for Comments 3954, Oct. 2004.

Case et al., "A Simple Network Management Protocol (SNMP)", Internet Engineering Task Force, Request for Comments 1157, May 1990.
Case et al., "Textual Conventions for Version 2 of the Simple Network Management Protocol (SNMPv2)", Internet Engineering Task Force, Request for Comments 1903, Jan. 1996.
Case et al., "Conformance Statements for Version 2 of the Simple Network Management Protocol (SNMPv2)", Internet Engineering Task Force, Request for Comments 1904, Jan. 1996.
Case et al., "Protocol Operations for Version 2 of the Simple Network Management Protocol (SNMPv2)", Internet Engineering Task Force, Request for Comments 1905, Jan. 1996.
Case et al., "Structure of Management Information for Version 2 of the Simple Network Management Protocol (SNMPv2)", Internet Engineering Task Force, Request for Comments 1902, Jan. 1996.
Case et al., "Transport Mappings for Version 2 of the Simple Network Management Protocol (SNMPv2)", Internet Engineering Task Force, Request for Comments 1906, Jan. 1996.
Case et al., "Management Information Base for Version 2 of the Simple Network Management Protocol (SNMPv2)", Internet Engineering Task Force, Request for Comments 1907, Jan. 1996.

* cited by examiner

*Primary Examiner* — Dante Ravetti

(57) ABSTRACT

An approach is provided for managing bandwidth utilization. A networking device (e.g., router) corresponding to a customer is audited to determine utilization of a communication link serving the customer. A determination is made whether bandwidth, allocated to the customer, of the communication link is under-utilized. A notification is generated to inform the customer of the under-utilization based on the determination. Further, a determination can be made whether the allocated bandwidth of the communication link is over-utilized, in which case, the notification includes an indication of one or more sources of traffic through the networking device.

24 Claims, 6 Drawing Sheets

US 9,082,089 B2

SYSTEM AND METHOD FOR MANAGING BANDWIDTH UTILIZATION

BACKGROUND INFORMATION

Various computer networks are used to interconnect computing devices (personal computers, workstations, peripheral devices, etc.) and are typically referred to by the area that the network interconnects (e.g., personal area networks (PANs), local area networks (LANs), campus area networks (CANs), metropolitan area networks (MANs), and wide area networks (WANs)). A network referred to as a "WAN" is typically a computer network that covers a broad geographical area, utilizes a collection of computer networking devices (e.g., routers, switches, hubs, etc.) and communication links. For example, WANs can be used to interconnect LANs and/or other networks, so that computing devices in one location can communicate with computing devices in other locations. Businesses may construct WANs for the use of their employees, and to interconnect various remote offices.

As the data communication amongst units of a business is important to the operation of the business, fast and efficient flow of data throughout the business is essential. The data links and networking devices are typically leased by telecommunication service providers, and thus subscribers or customers pay these providers for the data links that connect their facilities. Typically, leasing data links are expensive and the cost can grow exponentially with an increase in user devices connected to the data network (e.g., WAN) and associated applications. Such applications can be bandwidth intensive—e.g., video, high resolution images, etc. Unfortunately, conventional cost models have been inflexible, largely because mechanisms for monitoring and reporting bandwidth utilization have been inadequate or infeasible.

Therefore, there is a need for an approach that provides effective monitoring and reporting of bandwidth utilization as to permit the customer to pay only for actual bandwidth usage.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DETAILED DESCRIPTION OF THE PREFERRED EMBODIMENTS

A method and system for managing bandwidth utilization for a customer over a network. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although the description set forth below refers to wide area networks (WANs) and routers, the present invention, according to certain embodiments, have applicability to other networks irrespective of geographical characteristics and networking technologies and devices.

Figure 1:
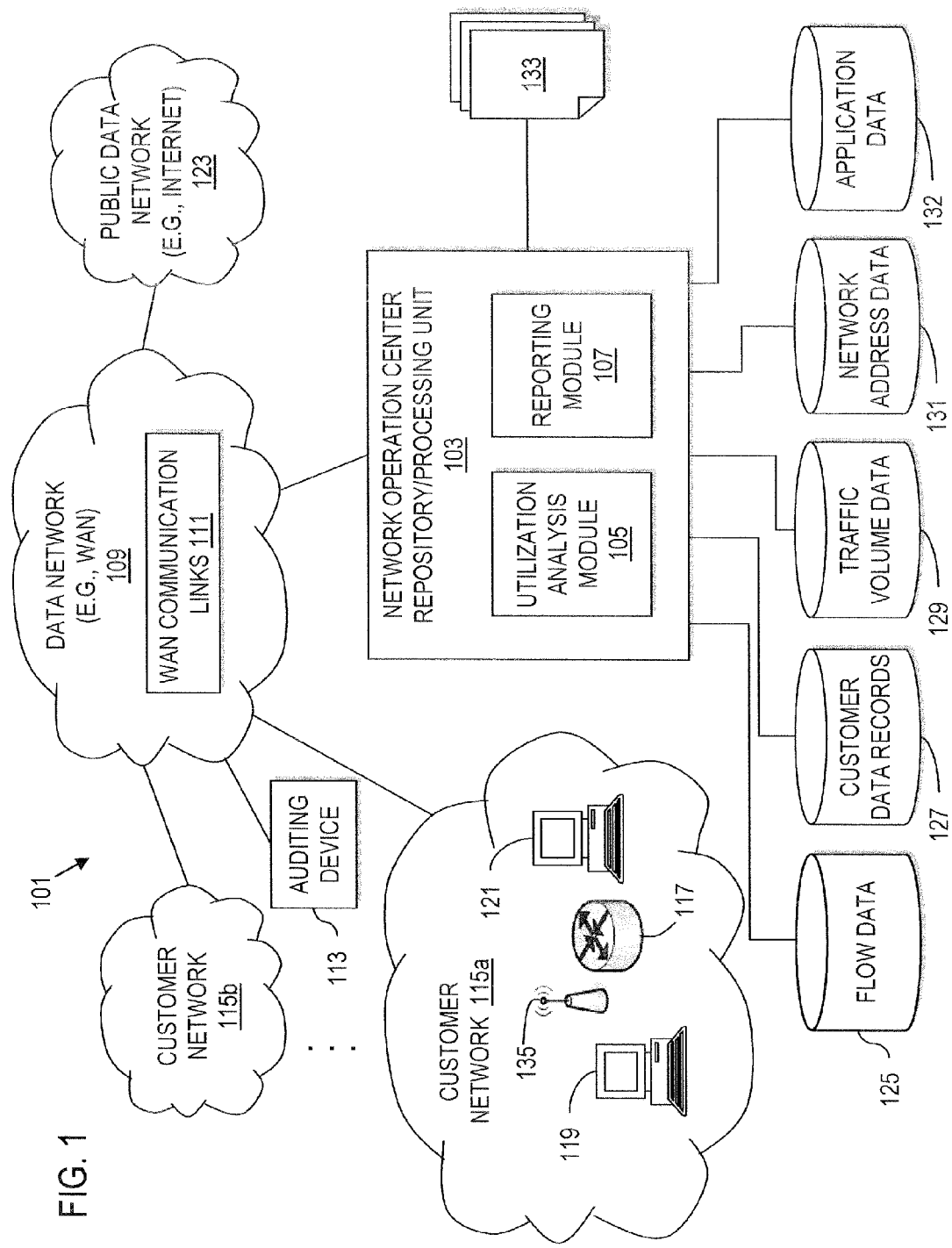
FIG. 1 is a diagram of a system capable of detecting and diagnosing bandwidth utilization of a network, according to an exemplary embodiment.

FIG. 1 is a diagram of a system capable of detecting and diagnosing bandwidth utilization of a network, according to an exemplary embodiment. A communication system 101 includes a network operation center (NOC) system 103, which includes a data repository and one or more processing units (i.e., denoted as "repository unit"). The repository unit 103 is responsible for performing operational and management functions of the system 101, and can interface with a number of different databases and modules for collecting data from one or more customer (or subscriber) networks 115a), 115b, etc. The repository unit 103 includes a utilization analysis module 105 that performs analysis of the collected data, and a reporting module 107 for generating reports for the customer.

As shown, a data network 109, which for the purposes of illustration is a wide area network (WAN), has WAN communication links 111 that can be provisioned by customers. Typically, a service level agreement (SLA) is negotiated between a service provider and the customer with respect to the amount of bandwidth, availability, quality of service (QoS), etc. regarding the links 111. As noted previously, data links can be a substantial expense for customers that seek to "tie" their geographically disparate networks. Traditionally, pricing models have been developed whereby the customer is penalized for imprecise traffic engineering projections. That is, the customer is charged for overages, typically at a higher rate. Not surprisingly, few or no pricing schemes have focused on remunerating the customer if the provisioned links are underutilized. It is recognized that the competitive nature of communication services requires development of pricing models that are more flexible and "customer"-centric. The approach of the system 101 attempts to charge customers for actual bandwidth usage.

An auditing device 113 is placed in the system 101 to provide collection of data related to the customer network. By way of example, the network 115a includes a networking device 117 that serves computing devices 119, 121 for connectivity to a public data network (e.g., global Internet) 123 or another private data network 115b. The networking device 117 can be any type of customer premise equipment (CPE) for supporting the networking technology utilized by the network 109. For example, the networking device 117 can be a switch that provides either frame relay, Asynchronous Transfer Mode (ATM), Fiber Distributed Data Interface (FDDI), synchronous optical network (SONET), Multi Protocol Label Switching (MPLS), etc.; or a device that provides access to a dedicated leased line, e.g., add-drop multiplexer, etc.

Figure 6:
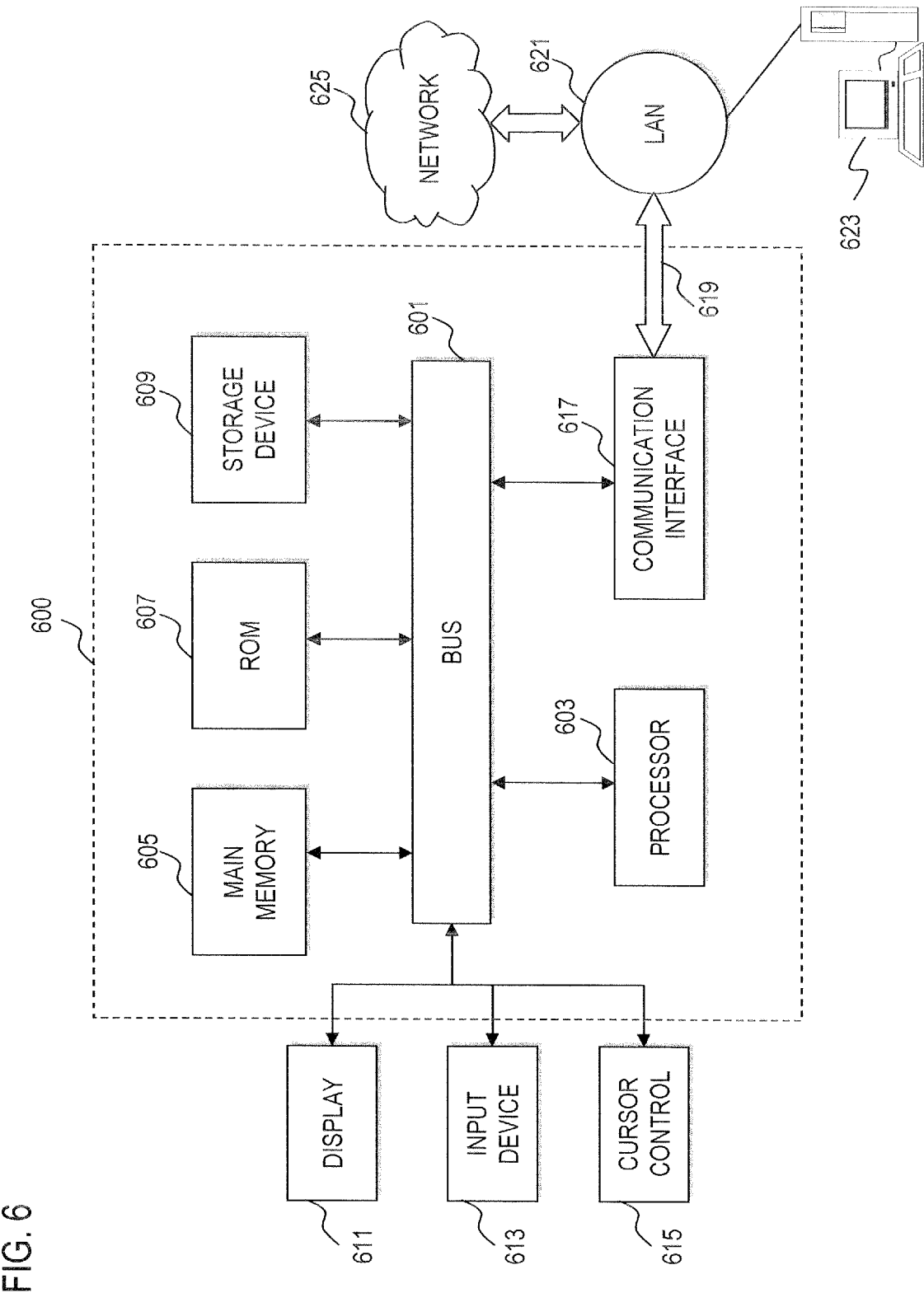
FIG. 6 is a diagram of a computer system that can be used to implement various exemplary embodiments.

Under the scenario of FIG. 1, the networking device 117 is described as a router, wherein the auditing device 113 can collect data relating to bandwidth utilization from the router 117. This data can then be processed and stored by the repository unit 103. The router 117 operates at the physical layer, link layer and network layer of the Open Systems Interconnection (OS) model to transport data across the network 109. The router 117 behaves as an edge router to a router-based system within the data network 109, for instance. In general, the router 117 can determine the "best" paths or routes by utilizing various routing protocols. Routing tables are maintained by each router for mapping input ports to output ports using information from routing protocols. Exemplary routing protocols include Border Gateway Protocol (BGP), Interior Gateway Routing Protocol (IGRP), Routing Information Protocol (RIP), and Open Shortest Path First (OSPF). In addition to intelligently forwarding data, the routers can provide various other functions, such as firewalling, encryption, etc. These router functions can be performed using a general purpose computer (as shown in FIG. 6), or be highly specialized hardware platform with greater processing capability to process high volumes of data and hardware redundancies to ensure high reliability.

The repository unit 103 has access to various databases for storage and retrieval of the collected data: a flow data database 125, a customer data records database 127, a traffic volume data database 129, a network address (e.g., internet protocol (IP)) data database 131, and an application data database 132. The repository unit 103 uses the utilization analysis module 105 to perform various processing and analyses of the data, and the reporting module 107 also has the capability to compile and generate reports 133 for the customer.

The reporting module 107 can supply customers with recommendations in easy to understand, management type of reports that can be directed towards non-IT (information technology) personnel or in more in-depth technical type reports including technical details for more technical staff. For example, the customer's non-technical IT management team typically needs recommendations and information about the health of its network using, for instance, non-technical terminology, such as categorizing the networking devices 117 by location (e.g., region or physical street address) rather than by device hostname.

With respect to the customer network 115a, the computing devices 119, 121 can communicatively interconnected via a wireless data link using a wireless access point 135; alternatively, wired networking technology can be utilized.

Although not explicitly shown in FIG. 1, it should be noted that the system 101 can be used to detect and diagnose bandwidth utilization of multiple customer networks 115a and 115b associated with the same subscriber or different subscribers. The data collection can be performed concurrently by one or more auditing devices 113, wherein the data is stored and manipulated by the unit 103 from each particular customer.

The utilization analysis module 105 can be invoked to initiate auditing of the data based on the billing cycle of the customer, or on-demand. When an audit of the customer network is performed using the auditing device 113, the repository unit 103 directs the storage of flow data from the networking device 117 into the flow data database 125. Assuming the device 117 is a router, such a networking device 117 can be configured to export flow data at regular intervals (e.g., every minute, every five minutes, etc.) to the auditing device 113, or to other collecting devices that are resident elsewhere in the system 101. For example, the router 117 can provide Cisco NetFlow™ statements for assisting with accurate bandwidth utilization determination. The stored data is then retrieved by the utilization analysis module 105. Internet Engineering Task Force (IETF) Request for Comment (RFC) 3954 more fully describes Cisco NetFlow™ and is incorporated herein by reference in its entirety. According to certain embodiments, a flow is used herein to refer to a sequence of packets with common properties passing through a networking device. The statements include flow records, which specify such information as network addresses, IP addresses, packet and byte counts, timestamps, Type of Service (ToS), application ports, input and output interfaces, etc.

Thus, by auditing the customer network 115a in this manner, information about network users and applications can be determined, as well as information about peak usage times and traffic routing. The information for each customer can be categorized for storage in the flow data database 125 by hostname, for example.

The customer data records database 127 can be used to store information related to the customer, such as physical location(s) (e.g., region or street address) of router(s) used by that customer, hostnames, IP addresses, Service Delivery Operations (SDOs), or WAN link providers of that customer. This information is stored in the customer data records database 127 at the time the networking device 117 is accepted under management, and can be updated as needed, for example, any changes of router configurations or addition/removal of routers. The information for each customer can be categorized for storage in the customer data records database 127 by hostname, for example. The capacity of each WAN link 111 can also be stored in the customer data records database 127.

When an audit of the customer network 115a is performed using the auditing device 113, the repository unit 103 directs the storage of traffic volume data gathered during the audit in the traffic volume data database 129. For example, each networking device 117 can be polled via a network management protocol, such as simple network management protocol (SNMP), at regular intervals (e.g., every minute, every five minutes, etc.) to obtain the volume of data (e.g., in bytes) that are passing through the router interfaces. SNMP is a request-reply protocol that operates between a manager (e.g., unit 103) and an agent (e.g., device 117). The manager and agent use a Management Information Base (MIB) and a set of commands (e.g., GET, GET-NEXT, GET-RESPONSE, SET, and TRAP) to exchange information about devices. The MIB specifies information about the managed objects, and utilizes a numeric tag or object identifier (OID) for distinguishing variables in the MIB and SNMP messages. That is, each managed object in a MIB is assigned a unique identifier, which can include the object's type (e.g., counter, string, gauge, or address), the object's access level (e.g., read or read/write), size restrictions, and range information. Details of SNMP are more fully described in Internet Engineering Task Force (IETF) Request for Comments (RFCs) 1157 (SNMP), 1902 (MIB Structure), 1903 (Textual Conventions), 1904 (Conformance Statements), 1905 (Protocol Operations), 1906 (Transport Mapping), and 1907 (MIB); which are incorporate herein by reference in their entireties.

The instantaneous volume collected is saved into the traffic volume data database 129 and time-stamped for later retrieval. As earlier described, the information for each customer can be categorized for storage in the traffic volume data database 129.

The IP data database 131 can be used to store information related to the IP addresses of customer devices. Each IP address assigned to each customer device is recorded and saved into the IP data database 131 with related information such as the geographical region of the device's location, the responsible owner, and the appropriate business unit that has ownership of the device. The IP addresses are thus the elements of the customer network 115a as a set. The global network being represented as a set of IP addresses is broken down into subsets to represent virtual business units throughout the customer network. The information for each customer can be categorized for storage in the IP data database 131 by IP address, for example.

The application data database 132 can be used as an application repository that stores the customer hosting applications and represents applications by their representation pair, namely, server IP address and listening port.

Regarding the utilization of the WAN communication link 111 the router 117 can also be regularly audited via a secure shell network protocol (SSH) to determine that proper flow statements generated by the router 117—e.g., as to facilitate the export of Cisco NetFlow™ data to a management server (not shown) or NetFlow Collector™. According to one embodiment, the auditing device 113 can utilize a customer list of devices to perform the network audit. The data resulting from the audit, for instance, can provide detailed information of end-to-end data communications, such as source, destination, amount of bytes, and duration of the established data communication between two entities. The system 101 determines the volume of traffic passing through the router 117 and determines a minimum amount of bandwidth required to sustain that data load. For example, at the end of a billing period, the correct capacity needed for each WAN link 111 can be calculated using its data volume for that period as compared against its leased WAN link capacity, so that under or over utilizations can be flagged.

Thus, the system 101 provides for identifying and diagnosing over-utilization and under-utilization of communication links 111, whereby customers may better manage the cost of their communication services and the service provider can more efficiently utilize the resources of the network 109.

Figure 2:
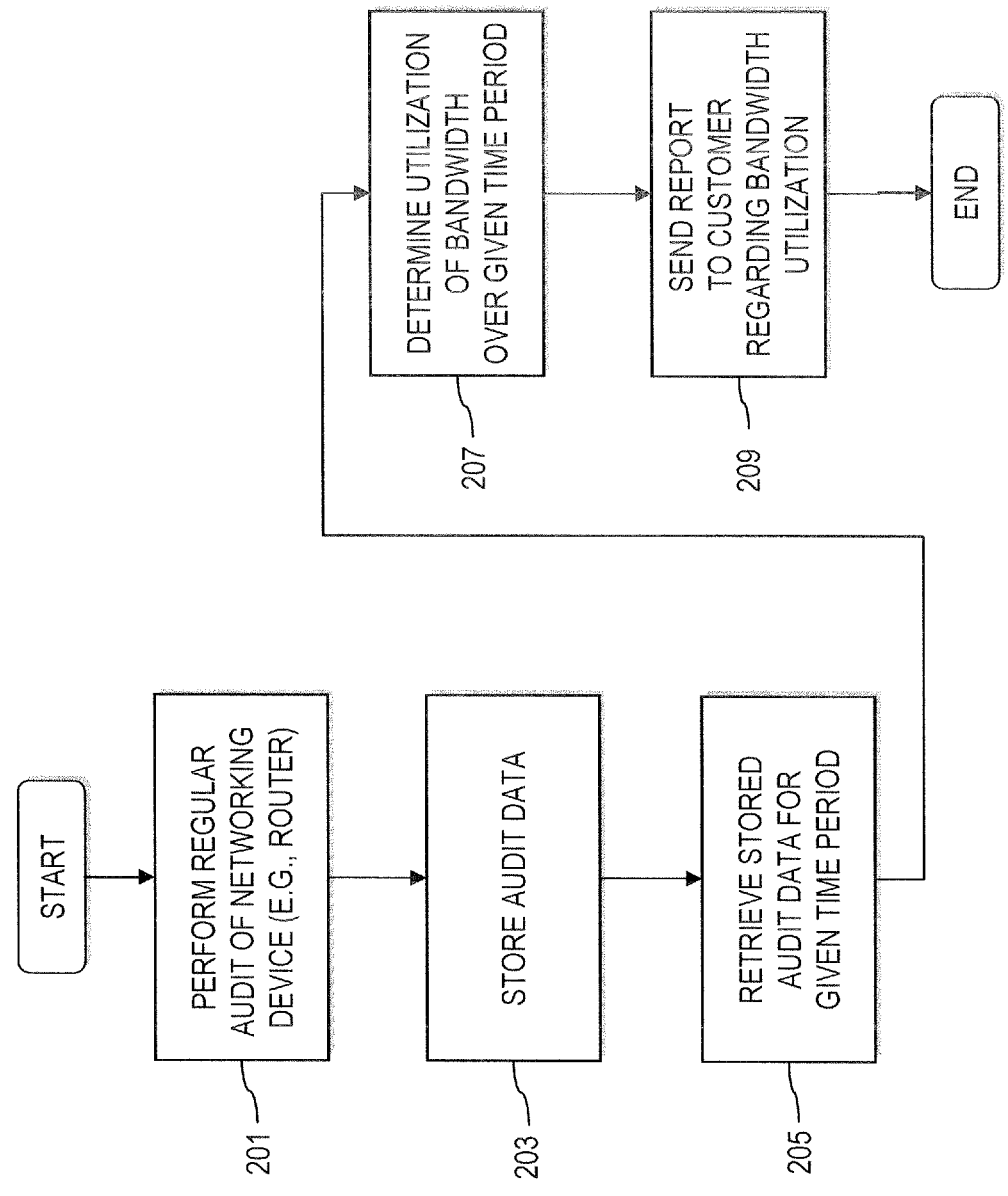
FIG. 2 is a flowchart of a process for determining and reporting bandwidth utilization to a customer, according to an exemplary embodiment.

FIG. 2 is a flowchart of a process for determining and reporting bandwidth utilization to a customer, according to an exemplary embodiment. In step 201, the auditing device 113 is used to perform audits of the networking device 117 of the customer network 115a with respect to the WAN communication link 111. The audits can be performed according to a schedule (e.g., periodically) or on-demand to acquire sufficient data points to provide an accurate analysis of the overall usage of the network 115a. The number of data points can be determined statistically using, for example, historical data.

Additionally, assuming the networking device 117 is a router, the router 117 can be configured to provide flow statements, such as Cisco NetFlow™ statements, for assisting with accurate bandwidth utilization determination. Accordingly, this router 117 can be periodically audited to ensure that configuration NetFlow™ statements supported so that flow information can be exported to the auditing device 113.

In step 203, the audit data is stored in the appropriate database, such as the flow data database 125, or the traffic volume data database 129, according to the type of data; the data is stored for later retrieval and analysis by the utilization analysis module 105. In step 205, the audit data for each interval over the corresponding time period (e.g., for a given billing cycle of the customer) is retrieved from the appropriate database by the repository unit 103. The repository unit 103 directs the utilization analysis module 105 to perform an analysis of the audit data.

In step 207, the utilization analysis module 105 determines the utilization of bandwidth for that given period of time using the audit data for each interval over that period of time. Then, in step 209, the repository unit 103 uses the results of the analysis to generate and send a bandwidth utilization report 133, via the reporting module 107, to the customer. The repository unit 103, in an exemplary embodiment, utilizes a customer to system common database field and a corresponding system to customer common database field to efficiently correlate the information in the system 101 to each particular customer.

Figure 3:
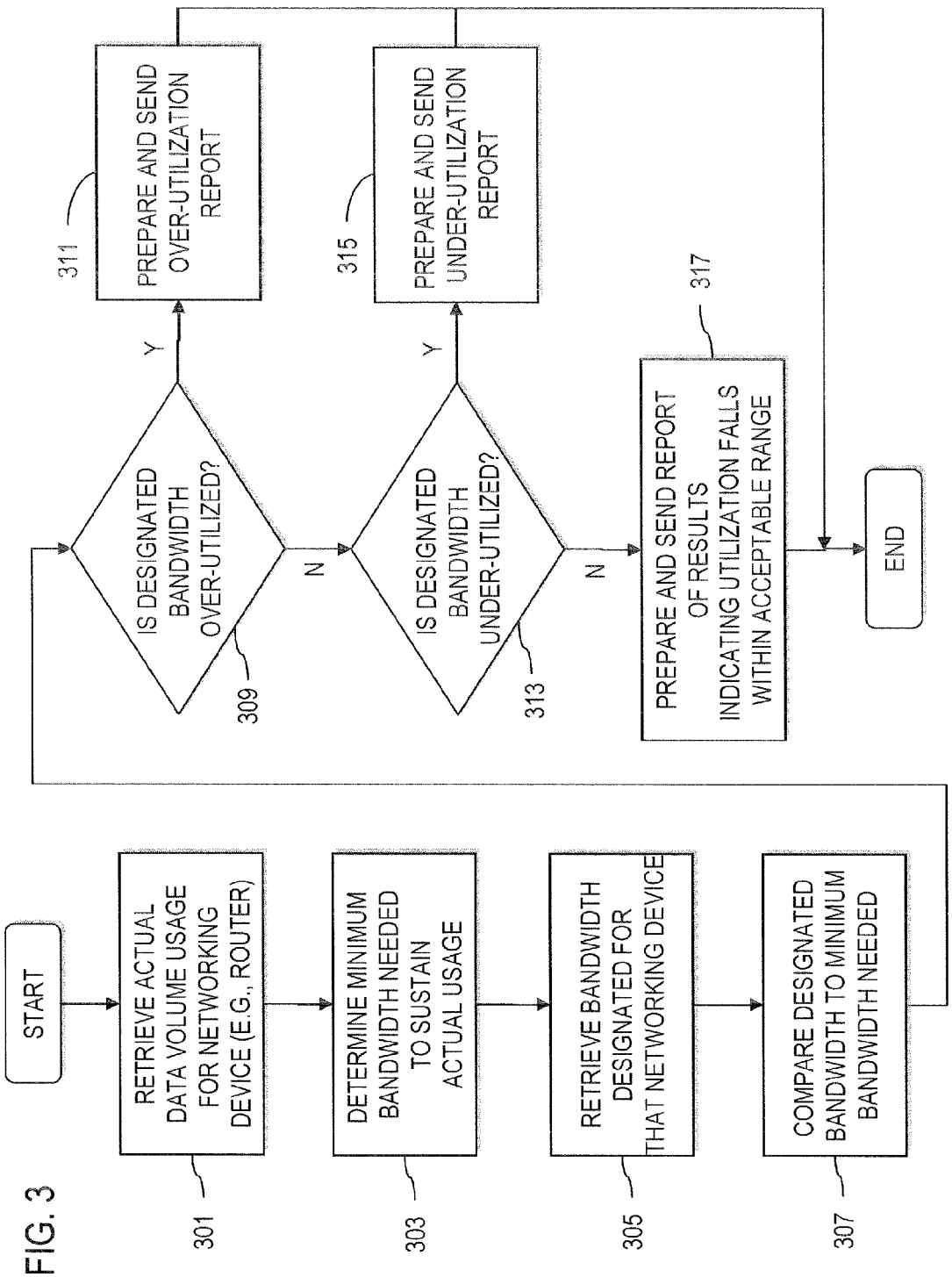
FIG. 3 is a flowchart of a process for determining whether the customer's designated bandwidth is over-utilized, is under-utilized, or whether the actual bandwidth utilization falls within an acceptable range of the designated bandwidth, and reporting the results to the customer, according to an exemplary embodiment.

FIG. 3 is a flowchart of a process for determining whether the customer's designated bandwidth is over-utilized, is under-utilized, or whether the actual bandwidth utilization falls within an acceptable range of the designated bandwidth, and reporting the results to the customer, according to an exemplary embodiment. In step 301, the utilization analysis module 105 retrieves the actual data volume usage for each customer networking device 117 over the period of time from the audit data. In step 303, the utilization analysis module 105 determines a theoretical minimum bandwidth needed to sustain the actual data volume usage over the period of time at maximum data transmission efficiency. In step 305, the utilization analysis module 105 then retrieves the bandwidth designated for the networking device 117 (which could also be a collection of devices)—for example, the amount of bandwidth the customer purchased during that period of time (i.e., during that billing cycle). In step 307, the calculator 307 compares the designated bandwidth (or purchased bandwidth) to the calculated minimum bandwidth needed.

In step 309, it is determined whether the bandwidth designated for the router is less than (or less than a given range around) the calculated minimum bandwidth needed (i.e. whether the designated bandwidth is over-utilized). If the designated bandwidth is determined to be over-utilized in step 309, then in step 311 an over-utilization report is prepared and sent to the customer by the repository unit 103. If the designated bandwidth is not determined to be over utilized, then it is determined, as in step 313, whether the bandwidth designated for the router is greater than (or greater than a given range or predetermined threshold) the calculated minimum bandwidth needed (i.e., whether the designated bandwidth is under-utilized). If the designated bandwidth is determined to be under-utilized, then in step 315 an under-utilization report is prepared and sent to the customer by the repository unit 103. If the designated bandwidth is not determined to be under-utilized in step 313, then in step 317 it is determined that the bandwidth designated for the router falls within an acceptable range and a report to this affect is prepared and sent to the customer by the repository unit 103, or alternatively no action is taken (i.e. no report is prepared or sent).

Thus, utilizing the process set forth in FIG. 3, the utilization analysis module 105 can take (in step 301) the SNMP data volume for each WAN link, and calculate (in step 303) a minimum bandwidth that would sustain the compiled data load (in bytes). Once the calculated minimum bandwidth is determined, it is compared with the actual designated bandwidth of the link in view (in step 307). If the calculated minimum bandwidth is greater than the designated bandwidth of the link in view, an over-utilization status is flagged per step 309. Thereafter, the repository unit 103 prepares and sends a report specifying information about the over-utilization; such information can include statistical data about the traffic and associated applications. The determination of bandwidth over-utilization is indicative of the fact that more data is passing through the interface than a negotiated or agreed capacity of the link. Consequently, data can be lost, or the applications that are sourcing or receiving the data would be negatively impacted. For example, in a Voice over IP call, the effective throughput can be reduced to a level where real-time voice exchange cannot be sustained.

On the other hand, if the calculated minimum bandwidth is smaller than the designated bandwidth of the WAN link 111, then an under-utilization condition is flagged (in step 313), thereby triggering the generation of an appropriate report by the repository unit 103. The report can provide the difference between the calculated minimum bandwidth and the designated bandwidth and monetizing the difference, as will be discussed further below. The determination of bandwidth under-utilization indicates that the designated bandwidth of the link 111 is in excess of the needed calculated bandwidth resulting in unused leased bandwidth; a threshold can be set relating to the amount of under-utilized bandwidth beyond with a report is prepared. In either case, the calculated minimum bandwidth is periodically stored (e.g., monthly, quarterly, etc.), and a pattern of the link utilization from a specified interval (e.g., month-to-month) is derived allowing the repository unit 103 to detect sudden changes in network utilization.

Figure 4:
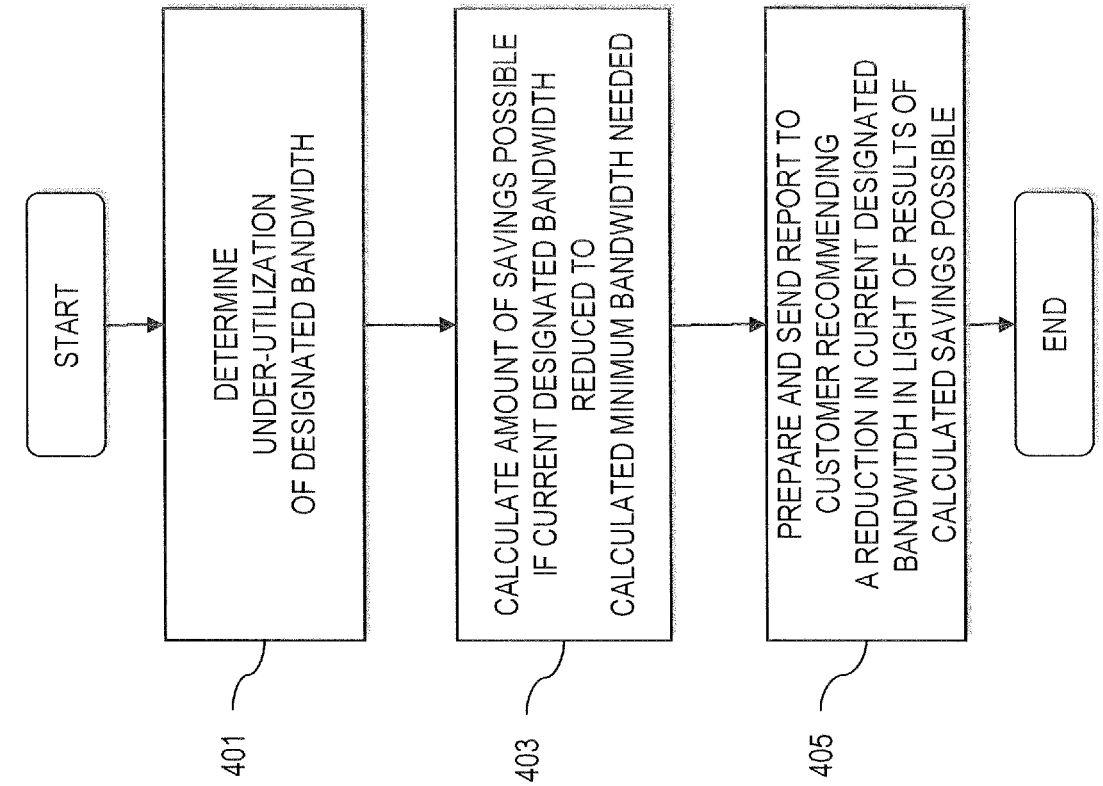
FIG. 4 is a flowchart of a process for reporting bandwidth under-utilization to a customer, according to an exemplary embodiment.

FIG. 4 is a flowchart of a process for reporting bandwidth under-utilization to a customer, according to an exemplary embodiment. When a determination is made of under-utilization of the designated bandwidth, as in step 401, the utilization analysis module 105 determines an amount of monetary savings that is possible to the customer if the current designated bandwidth is reduced to the calculated minimum bandwidth needed, as in step 403. Namely, a determination is made of the difference between the calculated minimum bandwidth and the current designated bandwidth; the difference is then translated into monetary savings that the customer would receive by reducing the current designated bandwidth by that difference (i.e. reducing the current designated bandwidth to the calculated minimum bandwidth). This calculated cost savings can then be provided to the customer in a report recommending such a reduction in the current designated bandwidth, per step 405. As part of the report, a recommendation is provided to downgrade the WAN link 111 in terms of capacity, thereby decreasing the customer cost for use of the WAN link 111 and eliminate capacity waste.

Thus, this process can help to protect customer investments in the network infrastructure by minimizing wasted capacity stemming from link under-utilization.

Figure 5:
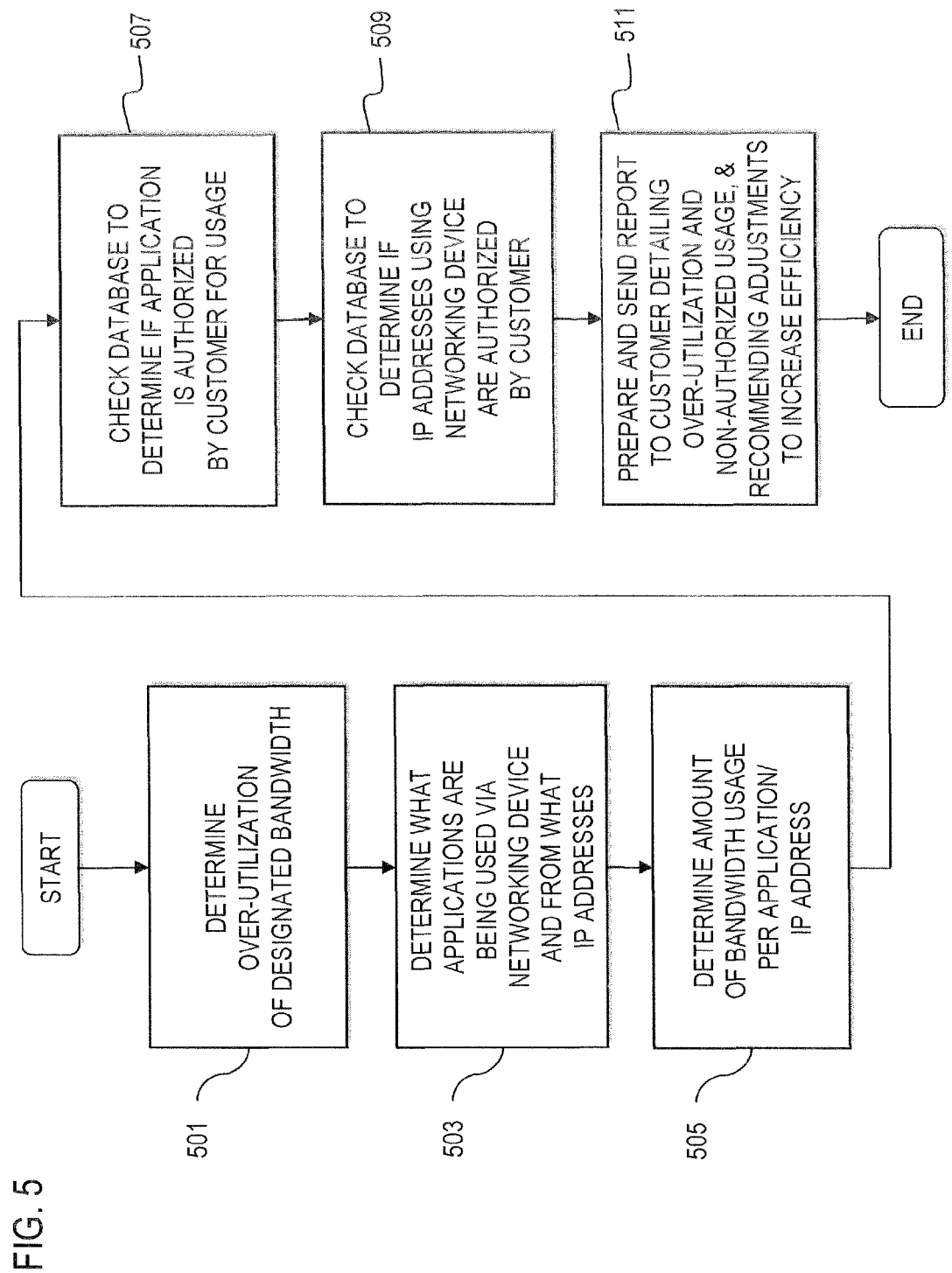
FIG. 5 is a flowchart of a process for reporting bandwidth over-utilization to a customer, according to an exemplary embodiment.

FIG. 5 is a flowchart of a process for reporting bandwidth over-utilization to a customer, according to an exemplary embodiment. When a determination is made of over-utilization of the designated bandwidth, as in step 501, the repository unit 103 can be used to provide the customer with a detailed report of the usage on the network to evaluate the usage and to determine the best course of action for correcting the situation. By way of example, the usage of the link 111 can be correlated with the amount of usage per each application; and this information can be provided to the customer. In an exemplary embodiment, the over-utilization is correlated with NetFlow™ information to provide the customer with the source of traffic on that WAN link 111 that caused or contributed the over utilization.

In step 503, the repository unit 103 can be used to determine what applications are being used via the networking device 117 and from what network addresses (e.g., IP address) over the given period of time by accessing the audit data in the appropriate databases, such the flow data database 125 and the traffic volume data database 129. In step 505, the repository unit 103 can be used to determine the amount of bandwidth usage per application and/or per network address over the given period of time by accessing the audit data in the appropriate databases, such as the flow data database 125 and the traffic volume data database 129. This information can then be used to generate a detailed usage report for the customer—for example, to identify certain application or IP address that require increased bandwidth, or even for the customer to use this information internally within their business to assign various costs associated with the usage to different entities, departments, or offices within the business for accounting or other purposes. For instance, assuming the network device 117 is a router, the customer can be provided with the router name, the physical location of the router, IP addresses of primary volume leader(s) in term of bandwidth consumption. Together with the identity of the WAN link 111 and cost, the customer is able to use the information to chargeback particular business units within the customer's company.

In addition to the above reporting of usage, the process of FIG. 5 can provide a security feature by checking usage for any non-authorized usage and informing the customer of such non-authorized usage so that corrective action can be taken if necessary. In step 507, the applications that are determined as having been used via the router in step 503 can be compared to a list of customer authorized applications stored in the application data database 132 to determine whether any non-authorized usage occurred during the time period, and the amount of bandwidth usage for such applications from step 505 can be correlated to this non-authorized usage for reporting to the customer. Also, in step 509, the IP addresses that are determined as having been used via the router in step 503 can be compared to a list of customer authorized IP addresses stored in the IP data database 131 in order to determine whether any non-authorized usage occurred during the time period, and the amount of bandwidth usage by such IP addresses from step 505 can be correlated to this non-authorized usage for reporting to the customer.

Based on the information collected in as steps 503-509, the repository unit 103 in step 511 can be used to compile and analyze the information collected, and to prepare and send a report 133 to the customer detailing the over-utilization including authorized and non-authorized usage, and recommending adjustments to the designated bandwidth in order to reduce leasing costs for the customer and increase efficiency of the network 109 for the service provider.

Additionally, the process uses the customer application-aware feature to differentiate bandwidth consumption by known/authorized applications and bandwidth consumption by unknown/illegitimate/non-authorized applications. In this manner, automatic correlation of bandwidth usage can made between legitimate/authorized applications and unknown/illegitimate/non-authorized applications. If an unknown application is detected, a report can be forwarded to the customer's designated security group, so that appropriate personnel (e.g., information technology (IT) managers, etc.) within the organization can decide whether to include the application as an authorized application in the customer's application data database or to block the application from the network.

The above processes of FIGS. 4 and 5 permit customers to manage their IT infrastructure in a cost-effective manner by focusing on the following factors: protection against network latency caused by link over-utilization; preserving investments against bandwidth waste caused by link under-utilization; and robust reporting capabilities for providing recommendations in easy to understand, non-technical format, as well as in detailed, technical format.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

FIG. 6 illustrates computing hardware (e.g., computer system) 600 upon which an embodiment according to the invention can be implemented, such as the overall system 101 or the hosting unit 103 depicted in FIG. 1. The computer system 600 includes a bus 601 or other communication mechanism for communicating information and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider or to the customer network 115a, 115b. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
auditing, by an apparatus, of a service provider a networking device corresponding to a customer to determine utilization of a communication link serving the customer; determining whether bandwidth, allocated to the customer, of the communication link is under-utilized;
generating, by the apparatus, recommendation information customized for the customer to reduce the allocated bandwidth, wherein the recommendation information includes cost savings information corresponding to the reduction; and
generating a notification to inform the customer of the under-utilization based on the determination and the recommendation information.

2. The method according to claim 1, further comprising:
receiving flow information from the network device;
determining actual bandwidth utilization for the customer based on the flow information; and comparing the actual bandwidth utilization with an allocated bandwidth for the customer.

3. The method according to claim 1, wherein the networking device is audited at regular intervals over a predetermined period of time, and wherein utilization of the bandwidth is determined for the predetermined period of time.

4. The method according to claim 3, wherein the predetermined period of time is a billing cycle of the customer.

5. The method according to claim 1, further comprising:
determining that the allocated bandwidth of the communication link is over-utilized, wherein the notification includes an indication of one or more sources of traffic through the networking device.

6. The method according to claim 5, wherein the sources include one or more applications.

7. The method according to claim 5, wherein the indication is a physical location of the source, a region where the source is located, an owner name, or a business unit.

8. The method according to claim 5, wherein the indication includes a break\-down of usage among units within a business entity.

9. The method according to claim 5, wherein the notification is generated if the under-utilization or the over-utilization satisfies a predetermined threshold.

10. The method according to claim 5, wherein the notification of the customer further includes notifying the customer of unauthorized usage of bandwidth through the networking device using an account of the customer.

11. The method according to claim 10, wherein the notification of unauthorized usage includes notifying the customer of an amount of bandwidth utilized for each unauthorized usage.

12. A system of a service provider comprising:
an auditing device configured to audit a networking device corresponding to a customer to determine utilization of a communication link serving the customer; and
an analysis module coupled to the auditing device and configured to determine whether bandwidth, allocated to the customer, of the communication link is under-utilized;
a generating module configured to generate recommendation information customized for the customer to reduce the allocated bandwidth, wherein the recommendation information includes cost savings information corresponding to the reduction; and
a reporting module configured to generate a notification to inform the customer of the under-utilization based on the determination and the recommendation information.

13. The system according to claim 12, wherein the analysis module is further configured to receive flow information from the network device, to determine actual bandwidth utilization for the customer based on the flow information; and to compare the actual bandwidth utilization with an allocated bandwidth for the customer.

14. The system according to claim 12, wherein the networking device is audited at regular intervals over a predetermined period of time, and wherein utilization of the bandwidth is determined for the predetermined period of time.

15. The system according to claim 14, wherein the predetermined period of time is a billing cycle of the customer.

16. The system according to claim 12, wherein the analysis module is further configured to determine that the allocated bandwidth of the communication link is over-utilized, wherein the notification includes an indication of one or more sources of traffic through the networking device.

17. The system according to claim 16, wherein the sources include one or more applications.

18. The system according to claim 16, wherein the indication is a physical location of the source, a region where the source is located, an owner name, or a business unit.

19. The system according to claim 16, wherein the indication includes a break\-down of usage among units within a business entity.

20. The system according to claim 16, wherein the notification is generated if the under-utilization or the over-utilization satisfies a predetermined threshold.

21. The system according to claim 16, wherein the notification of the customer further includes notifying the customer of unauthorized usage of bandwidth through the networking device using an account of the customer.

22. The system according to claim 21, wherein the notification of unauthorized usage includes notifying the customer of an amount of bandwidth utilized for each unauthorized usage.

23. The method according to claim 1, further comprising:
reducing the allocated bandwidth based on either per communication link, per networking device, per application running on the networking device, or a combination thereof, in response to a request from the customer.

24. The system according to claim 12, further comprising:
a reducing module configured to reduce the allocated bandwidth based on either per communication link, per networking device, per application running on the networking device, or a combination thereof, in response to a request from the customer.

* * * * *